(12) United States Patent
Zhang et al.

(10) Patent No.: US 8,718,001 B2
(45) Date of Patent: May 6, 2014

(54) SYSTEM AND METHOD FOR ALLOCATING SOUNDING REFERENCE SIGNAL RESOURCE

(75) Inventors: Rong Zhang, Shenzhen (CN); Peng Hao, Shenzhen (CN); Bin Yu, Shenzhen (CN); Bo Jin, Shenzhen (CN); Peng Zhu, Shenzhen (CN); Yuxin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 188 days.

(21) Appl. No.: 13/497,297

(22) PCT Filed: Jun. 30, 2010

(86) PCT No.: PCT/CN2010/074865
§ 371 (c)(1),
(2), (4) Date: Mar. 21, 2012

(87) PCT Pub. No.: WO2011/038606
PCT Pub. Date: Apr. 7, 2011

(65) Prior Publication Data
US 2012/0176999 A1    Jul. 12, 2012

(30) Foreign Application Priority Data

Sep. 29, 2009 (CN) .......................... 2009 1 0204775

(51) Int. Cl.
*H04W 72/04* (2009.01)

(52) U.S. Cl.
USPC .......................................... 370/329; 370/468

(58) Field of Classification Search
USPC .................................. 370/329, 336, 468, 442
See application file for complete search history.

(56) References Cited

U.S. PATENT DOCUMENTS

| | | | |
|---|---|---|---|
| 2008/0139237 A1* | 6/2008 | Papasakellariou | ............. 455/522 |
| 2009/0011762 A1* | 1/2009 | Han et al. | ....................... 455/434 |

(Continued)

FOREIGN PATENT DOCUMENTS

| | | |
|---|---|---|
| CN | 101340383 A | 1/2009 |
| CN | 101695191 A | 4/2010 |
| WO | WO/2009/056464 A1 | 5/2009 |

OTHER PUBLICATIONS

International Search Report from corresponding PCT application PCT/CN2010/074865, mailed Oct. 28, 2010 (with English translation).

*Primary Examiner* — Brian D Nguyen
(74) *Attorney, Agent, or Firm* — IPLM Group, P.A.

(57) ABSTRACT

A system and a method for allocating Sounding Reference Signal (SRS) resources are provided in the present invention, the method includes: an e-Node-B (eNB) allocating a SRS bandwidth with 4n Resource Blocks (RBs) to a terminal, and equally dividing a time domain sequence of a SRS into t portions in the SRS bandwidth; the eNB configuring a time domain RePetition Factor (RPF) used by the UE, and the eNB configuring the UE to use one or more cyclic shifts in L cyclic shifts for each UE; then the eNB notifying the UE of a value of the time domain RPF, a location of a used frequency comb and a used cyclic shift by signaling, wherein n is a positive integer; the RPF satisfies a following condition:

$$\frac{48 \times n}{RPF}$$

can be exactly divided by 12; t is an integer by which $$\frac{48 \times n}{RPF}$$

can be exactly divided; and L≤t.

10 Claims, 3 Drawing Sheets

(56) References Cited

U.S. PATENT DOCUMENTS

| | | |
|---|---|---|
| 2009/0116599 A1 | 5/2009 | McCoy |
| 2009/0238241 A1* | 9/2009 | Hooli et al. .................. 375/133 |
| 2010/0074205 A1* | 3/2010 | Papasakellariou et al. ... 370/329 |
| 2010/0080187 A1* | 4/2010 | Papasakellariou et al. ... 370/329 |
| 2010/0103902 A1* | 4/2010 | Kim et al. ..................... 370/330 |

* cited by examiner

SYSTEM AND METHOD FOR ALLOCATING SOUNDING REFERENCE SIGNAL RESOURCE

TECHNICAL FIELD

The present invention relates to the field of communications, and in particular, to a system and a method for allocating Sounding Reference Signal (SRS) resources.

BACKGROUND OF THE RELATED ART

A SRS is a signal used for measuring Channel State Information (CSI) between a User Equipment (UE) and an e-Node-B (eNB). In a Long Term Evolution (LTE) system, the UE periodically transmits an uplink SRS according to parameters indicated by the eNB, such as a bandwidth, a frequency domain location, a sequence cyclic shift, a period and a sub-frame offset etc. The eNB determines the uplink CSI of the UE according to the received SRS, and performs operations such as frequency domain selective scheduling, and closed loop power control etc. according to the obtained CSI.

In the LTE system, the SRS sequence transmitted by the UE is obtained by performing cyclic shift $\alpha$ on a root sequence $\bar{r}_{N,V}(n)$ in the time domain. Different SRS sequences can be obtained by performing different cyclic shifts $\alpha$ on the same root sequence, and the obtained SRS sequences are orthogonal with each other. Therefore, these SRS sequences can be allocated to different UEs for use, so as to implement code division multiple access among the UEs. In the LTE system, the SRS sequence defines 8 cyclic shifts $\alpha$, which are given by the following equation:

$$\alpha = 2\pi \frac{n_{SRS}^{cs}}{8}$$

wherein $n_{SRS}^{cs}$ is indicated by signaling with 3 bits, which are 0, 1, 2, 3, 4, 5, 6 and 7 respectively. That is to say that the UE in the cell has 8 available code resources in the same time-frequency resource, and the eNB can configure at most 8 UEs to transmit the SRS simultaneously on the same time-frequency resource. The above equation can be considered as equally dividing the SRS sequence into 8 portions in the time domain; however, as a length of the SRS sequence is a multiple of 12, the minimum length of the SRS sequence is 24.

In the LTE system, the frequency domain bandwidth of the SRS is configured by a tree structure. Each kind of SRS bandwidth configuration corresponds to one tree structure, and the SRS bandwidth of the highest layer corresponds to the largest SRS bandwidth of the SRS bandwidth configuration, or is called as a SRS bandwidth range. Tables 1 to 4 provide the SRS bandwidth configuration in different uplink SRS bandwidth ranges, wherein $N_{RB}^{UL}$ is the number of Resource Blocks (RBs) corresponding to the uplink SRS bandwidth.

TABLE 1

SRS bandwidth configuration of $6 \leq N_{RB}^{UL} \leq 40$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 2

SRS bandwidth configuration of $40 < N_{RB}^{UL} \leq 60$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 3

SRS bandwidth configuration of $60 < N_{RB}^{UL} \leq 80$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 4

SRS bandwidth configuration of $80 < N_{RB}^{UL} \leq 110$

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 2 | 4 | 1 |
| 6 | 48 | 1 | 24 | 2 | 12 | 2 | 4 | 3 |
| 7 | 48 | 1 | 16 | 3 | 8 | 2 | 4 | 2 |

The tree structure of the SRS bandwidth will be illustrated taking SRS bandwidth configuration index 1, i.e., $C_{SRS}=1$ in table 1. $B_{SRS}=0$ is layer 0, and is the highest layer of the tree structure. The SRS bandwidth of this layer is the bandwidth corresponding to 32 RBs, and is the largest SRS bandwidth of the SRS bandwidth configuration 1; $B_{SRS}=1$ is layer 1, the SRS bandwidth of this layer is the bandwidth corresponding to 16 RBs, and the SRS bandwidth of the upper layer, i.e., layer 0 is divided into 2 SRS bandwidths of layer 1; $B_{SRS}=2$ is layer 2, the SRS bandwidth of this layer is the bandwidth corresponding to 8 RBs, and the SRS bandwidth of the upper layer, i.e., layer 1 is divided into 2 SRS bandwidths of layer 2; and $B_{SRS}=3$ is layer 3, the SRS bandwidth of this layer is the bandwidth corresponding to 4 RBs, and the SRS bandwidth of the upper layer, i.e., layer 2 is divided into 2 SRS bandwidths of layer 3, and the tree structure thereof is shown in FIG. 1.

In the LTE system, the eNB firstly allocates a SRS bandwidth configuration index $C_{SRS}$ to all UEs in a cell, and the UE can determine to use which table in tables 1 to 4 according to $C_{SRS}$ and a number of RBs corresponding to the current uplink bandwidth, i.e., $N_{RB}^{UL}$, and then can determine the SRS bandwidth configuration that is used by the current cell according to $C_{SRS}$. For a plurality of UEs, the eNB can further allocate one SRS bandwidth index $B_{SRS}$ (or is called as an index of a located layer) to the UE. The UE can obtain the SRS bandwidth used by the UE according to the SRS bandwidth configuration and the SRS bandwidth index $B_{SRS}$ in the cell. For example, if the SRS bandwidth configuration index of the current cell $C_{SRS}=1$ and $N_{RB}^{UL}=50$, the UE determines that the SRS bandwidth configuration of the current cell is the second row in table 2. If the SRS bandwidth index allocated by the eNB of the current cell to the UE is 1, the SRS bandwidth of the UE occupies 16 RBs, and the SRS bandwidth location of the UE is within the SRS bandwidth range, i.e., within a range of the largest SRS bandwidth with 48 RBs.

The UE will determine an frequency domain initial location for transmitting the SRS by itself according to a frequency domain location $n_{RRC}$ of the upper layer signaling transmitted by the eNB after obtaining the own SRS bandwidth. As shown in FIG. 2, the UEs to which different $n_{RRC}$ are allocated will transmit the SRS in different regions of the SRS bandwidth of the cell.

The sequence that is used by the SRS is selected from a group of Demodulation Reference Signal (DMRS) sequences. When the SRS bandwidth of the UE is 4 RBs, a Computer Generated (CG) sequence with a length of 2 RBs will be used; and when the SRS bandwidth of the UE is larger than 4 RBs, a Zadoff-Chu sequence with a corresponding length will be used.

In addition, in the same SRS bandwidth, the sub-carriers of the SRS are placed at intervals, that is, the SRS is transmitted using a comb structure, and the number of frequency combs in the LTE system is 2, which also corresponds to the time domain RePetition Factor (RPF) 2. As shown in FIG. 3, when each UE transmits the SRS, only one of the two frequency combs is used, i.e., comb=0 or comb=1. Thus, the UE only uses a sub-carrier with an even or odd frequency domain index to transmit the SRS according to the indication of 1 bit upper layer signaling. Such a comb structure allows more UEs to transmit the SRS in the same SRS bandwidth.

In the same SRS bandwidth, a plurality of UEs can use different cyclic shifts on the same frequency comb, and then transmit the SRS by code division multiplexing, or two UEs can transmit the SRS by frequency division multiplexing on different frequency combs. For example, in the LTE, there are 8 available cyclic shifts for the UE who transmits the SRS in a certain SRS bandwidth (4 RBs), and there are 2 available frequency combs. Therefore, the UE has 16 resources which can be used to transmit the SRS in all, that is, at most 16 SRSs can be transmitted simultaneously in the SRS bandwidth. As the uplink Single User Multiple Input Multiple Output (SU-MIMO) is not supported in the LTE system, there is only one antenna for the UE to transmit the SRS at each time, and thus, one UE only needs one SRS resource. Therefore, in the above SRS bandwidth, the system can at most multiplex 16 UEs simultaneously.

A LTE-Advanced (LTE-A) system is the next generation evolution system of the LTE system. The SU-MIMO is supported in the uplink, and at most 4 antennas can be used as uplink transmitting antennas. That is, the UE can transmit the SRS on a plurality of antennas simultaneously at one time, while the eNB needs to estimate a state on each channel according to the SRS received by each antenna.

The current research on the LTE-A proposes that a non-precoded (that is, antenna-specific) SRS should be used in uplink communication. At this point, when the UE uses a plurality of antennas to transmit the non-precoded SRS, the SRS resources required by each UE will increase, which leads to the number of the UEs which can be multiplexed simultaneously in the system reducing.

For example, in a certain SRS bandwidth (4 RBs), if each UE uses 4 antennas to transmit the SRS, the number of the resources required by each HE is 4. Upon the above description that the number of the SRS resources which can be supported in one SRS bandwidth is 16 in all, the number of UEs which can be multiplexed in the SRS bandwidth is reduced to 4. The number of users who can be multiplexed in the system simultaneously is ¼ of that of the original LTE.

Since the requirement of the LTE-A proposes that the number of the users who can be accommodated in the LTE-A system should be not less than that in the LTE system, the requirement is contradiction with the above practice that the number of the users reduces when the SRS is transmitted by a plurality of antennas. Solving the contradiction between the requirements on the user capacity of the LTE-A and the reduction of the number of the users when the SRS is transmitted by a plurality of antennas can be implemented by increasing available SRS resources in the system in practical. Therefore, how to increase the SRS resources in the system becomes a problem to be solved.

SUMMARY OF THE INVENTION

The technical problem to be solved by the present invention is to provide a system and a method for allocating SRS resources, which can efficiently increase the number of the SRS resources in the LTE-A system.

In order to solve the above problem, the present invention provides a method for allocating SRS resources, comprising:

assuming that an e-Node-B (eNB) allocates a SRS bandwidth with 4n Resource Blocks (RBs) to a terminal, and a time domain sequence of a SRS is equally divided into t portions in the SRS bandwidth; and the eNB configuring a time domain RePetition Factor (RPF) used by the terminal, and for each terminal, the eNB configuring the terminal to use one or more cyclic shifts in L cyclic shifts, then the eNB notifying the terminal of a value of the time domain RPF, a location of a used frequency comb and a used cyclic shift by signaling; wherein, n is a positive integer; the RPF satisfies a following condition:

$$\frac{48 \times n}{RPF}$$

can be exactly divided by 12; t is an integer by which $$\frac{48 \times n}{RPF}$$

can be exactly divided; and L≤t.

The RPF=2, and t is an integer by which 24n can be exactly divided; and the step of the eNB notifying the terminal of the value of the time domain RPF, the location of the used frequency comb and the used cyclic shift by signaling comprises: the eNB transmitting a notification message to the terminal, wherein the notification message includes the value of the time domain RPF, the location of the frequency comb used by the terminal and the cyclic shift used by the terminal, and the cyclic shift used by the terminal is indicated by i bit signaling, wherein $2^{i-1}<L\leq 2^i$.

When the SRS bandwidth allocated by the eNB to the terminal is 4 RBs, a value of the t is 8, 12 or 24, and a total number of the corresponding cyclic shifts is 8, 12 or 24 at this point; and when L=8, the eNB uses 3 bit signaling to indicate the cyclic shift used by the terminal; when 9<L≤16, the eNB uses 4 bit signaling to indicate the cyclic shift used by the terminal; and when 17<L≤24, the eNB uses 5 bit signaling to indicate the cyclic shift used by the terminal.

RPF=4, and the t is an integer by which 12n can be exactly divided; and the step of the eNB notifying the terminal of the value of the time domain RPF, the location of the used frequency comb and a used cyclic shift by signaling comprises: the eNB transmitting a notification message to the terminal, wherein the notification message includes the value of the time domain RPF, the location of the frequency comb used by the terminal and the cyclic shift used by the terminal, and the cyclic shift used by the terminal is indicated by i bit signaling, wherein $2^{i-1}<L\leq 2^i$.

When the SRS bandwidth allocated by the eNB to the terminal is 4 RBs, a value of the t is 4, 6 or 12; and when L=4, the eNB uses 2 bit signaling to indicate the cyclic shift used by the terminal; when 5<L≤8, the eNB uses 3 bit signaling to indicate the cyclic shift used by the terminal; and when 9<L≤12, the eNB uses 4 bit signaling to indicate the cyclic shift used by the terminal.

The present invention further provides a system for allocating Sounding Reference Signal (SRS) resources, comprising an e-Node-B (eNB) and one or more User Equipments (terminals), wherein the eNB is configured to:
allocate a SRS bandwidth with 4n Resource Blocks (RBs) to the terminal, and equally divide a time domain sequence of a SRS into t portions in the SRS bandwidth;
configure a time domain RePetition Factor (RPF) used by the terminal in the SRS bandwidth, and configure to use one or more cyclic shifts in L cyclic shifts for each terminal, and
notify the terminal of a value of the time domain RPF, a location of a used frequency comb and a used cyclic shift by signaling; wherein n is a positive integer; the RPF satisfies a following condition:

$$\frac{48 \times n}{RPF}$$

can be exactly divided by 12; t is an integer by which $$\frac{48 \times n}{RPF}$$

can be exactly divided; and L≤t.

RPF=2, and t is an integer by which 24n can be exactly divided; and the eNB is configured to: carry the value of the time domain RPF, the location of the frequency comb used by the terminal and the cyclic shift used by the terminal when transmitting a notification message to the terminal, wherein the cyclic shift used by the terminal is indicated by i bit signaling, wherein $2^{i-1}<L\leq 2^i$.

The eNB is configured to:
let a value of the t to be 8, 12 or 24 when allocating the SRS bandwidth with 4 RBs to the terminal, wherein a total number of the corresponding cyclic shifts is 8, 12 or 24 at this point; and when L=8, use 3 bit signaling to indicate the cyclic shift used by the terminal; when 9<L≤16, use 4 bit signaling to indicate the cyclic shift used by the terminal; and when 17<L≤24, use 5 bit signaling to indicate the cyclic shift used by the terminal.

RPF=4, and t is an integer by which 12n can be exactly divided; and the eNB is configured to carry the value of the time domain RPF, the location of the frequency comb used by the terminal and the cyclic shift used by the terminal when transmitting a notification message to the terminal, wherein the cyclic shift used by the terminal is indicated by i bit signaling, wherein $2^{i-1}<L\leq 2^i$.

The eNB is configured to:
let a value of the t to be 4, 6 or 12 when allocating the SRS bandwidth with 4 RBs to the terminal; and when L=4, use 2 bit signaling to indicate the cyclic shift used by the terminal; when 5<L≤8, use 3 bit signaling to indicate the cyclic shift used by the terminal; and when 9<L≤12, use 4 bit signaling to indicate the cyclic shift used by the terminal.

In conclusion, the present invention provides a system and a method for allocating SRS resources, which can efficiently increase the number of SRS resources in the LTE-A system. When the number of frequency combs used by the terminal is configured to be greater than 2 (for example 4), or the number of the cyclic shifts which can be used by the SRS is greater than 8, the SRS resources in the system can be increased efficiently.

PREFERRED EMBODIMENTS OF THE PRESENT INVENTION

Figure 1:
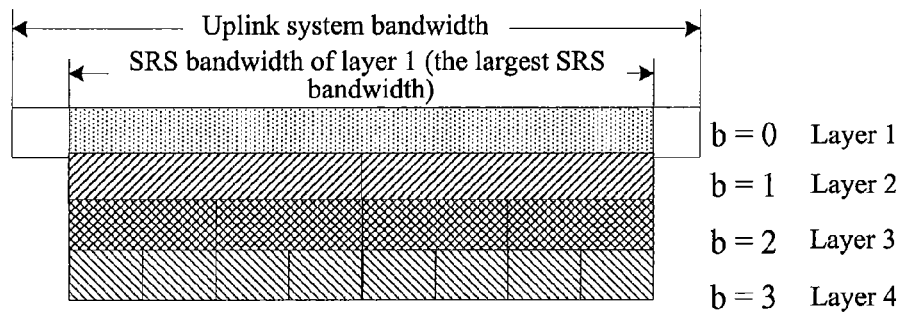
FIG. 1 is a schematic diagram of a tree structure of a SRS bandwidth.
Figure 2:
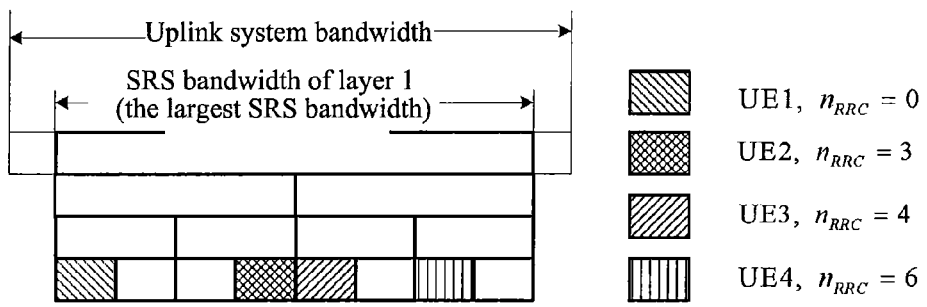
FIG. 2 is a schematic diagram of a frequency domain initial location for transmitting a SRS by a UE to which different $n_{RRC}$ are allocated.
Figure 3:
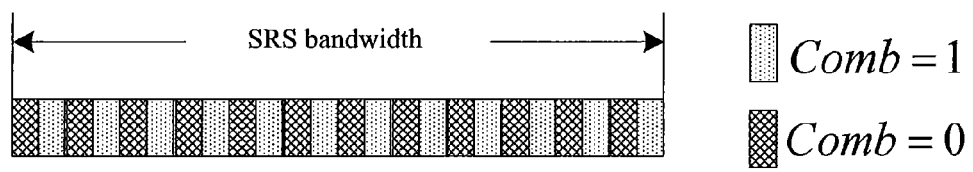
FIG. 3 is a schematic diagram of a comb structure of a SRS.

The present embodiment provides a system for allocating SRS resources in a LTE-A system, which comprises: an eNB and one or more terminals.

Assume that a SRS bandwidth allocated by the eNB to the terminal is 4n RBs, and a time domain sequence of a SRS is equally divided into t portions in the SRS bandwidth.

The eNB is configured to: configure a RPF used by the terminal in the above SRS bandwidth, and is further configured to: configure to use one or more cyclic shifts in L cyclic shifts for each terminal and notify the terminal of a value of the time domain RPF, a location of a used frequency comb and a used cyclic shift by signaling.

n is a positive integer; the RPF satisfies the following condition:

$$\frac{48 \times n}{RPF}$$

can be exactly divided by 12;
t is an integer by which $$\frac{48 \times n}{RPF}$$

can be exactly divided; and L≤t.

(a) PRF=2, and t is an integer by which 24n can be exactly divided;

when the SRS bandwidth allocated by the eNB to the terminal is 4 RBs, a value of t is 8, 12 or 24, and a total number of the corresponding cyclic shifts is 8, 12 or 24 at this point;

when L=8, the eNB uses 3 bit signaling to indicate the cyclic shift used by the terminal; when 9<L≤16, the eNB uses 4 bit signaling to indicate the cyclic shift used by the terminal; and when 17<L≤24, the eNB uses 5 bit signaling to indicate the cyclic shift used by the terminal.

(b) RPF=4, and t is an integer by which 12n can be exactly divided;

when the SRS bandwidth allocated by the eNB to the terminal is 4 RBs, a value of t is 4, 6 or 12; and when L=4, the eNB uses 2 bit signaling to indicate the cyclic shift used by the terminal; when 5<L≤8, the eNB uses 3 bit signaling to indicate the cyclic shift used by the terminal; and when 9<L≤12, the eNB uses 4 bit signaling to indicate the cyclic shift used by the terminal.

The eNB notifying the terminal of a value of the time domain RPF, a location of a used frequency comb and a used cyclic shift by signaling refers to the eNB carrying the value of the time domain RPF, the location of the frequency comb used by the terminal and the cyclic shift used by the terminal when transmitting a notification message to the terminal; and the number of bits used for indicating the value of the time domain RPF, the location of the frequency comb used by the terminal and the cyclic shift used by the terminal can be determined as required, and the cyclic shift used by the terminal can be indicated by i bit signaling, wherein $2^{i-1}<L\leq 2^i$.

The present embodiment provides a method for allocating SRS resources in a LTE-A system. Assume that a SRS bandwidth allocated by an eNB to a terminal is 4n RBs, and a time domain sequence of a SRS is equally divided into t portions in the above SRS bandwidth; and in the SRS bandwidth, the eNB configures a RPF used by the terminal, and for each terminal, the eNB configures the terminal to use one or more cyclic shifts in L cyclic shifts, wherein n is a positive integer; the RPF satisfies the following condition:

$$\frac{48 \times n}{RPF}$$

can be exactly divided by 12;
t is an integer by which $$\frac{48 \times n}{RPF}$$

can be exactly divided; and L≤t.

After implementing the above configuration, the eNB transmits a notification message to the UE, and the notification message includes the following information: a value of the RPF, a location of a frequency comb used by the UE and a cyclic shift used by the UE.

After receiving the above notification message, the UE acquires the mode of the RPF, and the used frequency comb and cyclic shift. Hereinafter, the UE transmits the SRS on the configured frequency comb and cyclic shift.

The scheme of the present invention will be further described by a plurality of application embodiments hereinafter.

Application Embodiment 1

In the present application embodiment, assume that a SRS bandwidth allocated by an eNB to a UE is 4 RBs.

Figure 4:
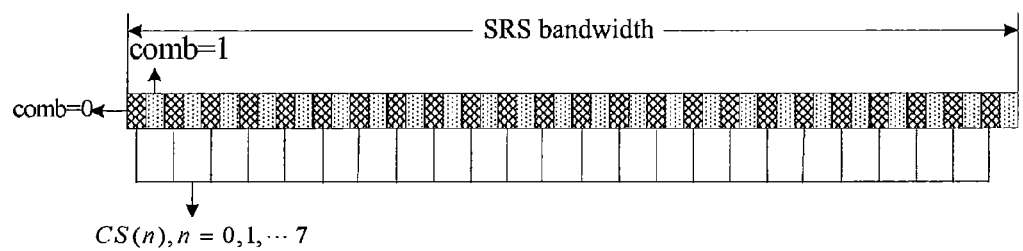
FIG. 4 is a schematic diagram of transmitting a SRS with RPF of 2 in application embodiment 1.

In step 101, the eNB configures the UE to use a mode of RPF=2, and specifies a location of a frequency comb used by the UE, for example, using comb0. A time domain sequence of a SRS can be equally divided into 8 portions, which correspond to a total number of 8 available cyclic shifts. The eNB can configure the UE to use one or more cyclic shifts in the 8 cyclic shifts, as shown in FIG. 4.

As RPF=2, a length of the SRS sequence is 2 RBs, and the sequence used by the UE is a CG sequence with a length of 2 RBs in a group of DMRS sequences corresponding to the UE.

In step 102, after implementing the above configuration, the eNB transmits a notification message to the UE, and the notification message includes the following information: a value of the RPF, a location of a frequency comb used by the UE and a cyclic shift used by the UE; the number of bits used for indicating the value of the RPF, the location of the frequency comb used by the UE and the cyclic shift used by the UE can be determined as required, for example, it can be but is not limited to using 1 bit to indicate the value of the RPF, using 1 bit or 2 bits to indicate the location of the frequency comb used by the UE, and using 3 bits to indicate the cyclic shift used by the UE.

In step 103, after receiving the notification message, the UE acquires the mode of the RPF, and the used frequency comb and cyclic shift. Then, the UE transmits the SRS on the configured frequency comb and cyclic shift.

In the embodiment, the number of the available SRS resources in one SRS bandwidth (4 RBs) is 16, which is the same as the number of the available SRS resources in one SRS bandwidth (4 RBs) in the LTE system.

Application Embodiment 2

In the present application embodiment, assume that a SRS bandwidth allocated by an eNB to a UE is 4 RBs.

Figure 5:
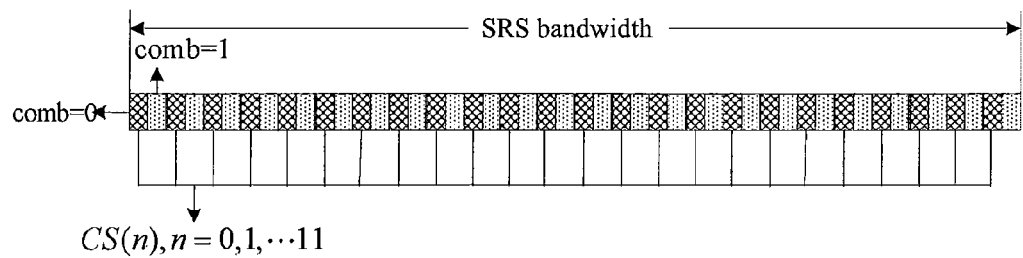
FIG. 5 is a schematic diagram of transmitting a SRS with RPF of 2 in application embodiment 2.

In step 201, the eNB configures the UE to use a mode of RPF=2, and specifies a location of a frequency comb used by the UE, for example, using comb0. A time domain sequence of a SRS can be equally divided into 12 portions, which corresponds to a total number of 12 available cyclic shifts. The eNB can configure the UE to use one or more cyclic shifts in the 12 cyclic shifts, as shown in FIG. 5.

As RPF=2, a length of the SRS sequence is 2 RBs, and the sequence used by the UE is a CG sequence with a length of 2 RBs in a group of DMRS sequences corresponding to the UE.

In step 202, after implementing the above configuration, the eNB transmits a notification message to the UE, and the notification message includes the following information: a value of the RPF, a location of a frequency comb used by the UE and a cyclic shift used by the UE; and the number of bits used for indicating the value of the RPF, the location of the frequency comb used by the UE and the cyclic shift used by the UE can be determined as required, for example, it can be but is not limited to using 1 bit to indicate the value of the RPF, using 1 bit or 2 bits to indicate the location of the frequency comb used by the UE, and using 4 bits to indicate the cyclic shift used by the UE.

In step 203, after receiving the notification message, the UE acquires the mode of the RPF, and the used frequency comb and cyclic shift. Then, the UE transmits the SRS on the configured frequency comb and cyclic shift.

In the embodiment, the number of the available SRS resources in one SRS bandwidth (4 RBs) is 24, which increases 50% relative to the number of the available SRS resources in one SRS bandwidth (4 RBs) in the LTE system.

When the SRS bandwidth is 4 RBs and RPF=2, the time domain sequence of the SRS pilot frequency can further be equally divided into 24 portions, i.e., the total number of the cyclic shifts is 24. The eNB can configure the UE to use one or more cyclic shifts in the 24 cyclic shifts, and at this point, it is needed to use 5 bits to indicate the cyclic shift used by the UE.

Application Embodiment 3

In the present application embodiment, assume that a SRS bandwidth allocated by an eNB to a UE is 4 RBs.

In step 301, the eNB configures the UE to use a mode of RPF=4, and specifies a location of a frequency comb used by the UE, for example, using comb0. A time domain sequence of a SRS pilot frequency can be equally divided into 12 portions, which corresponds to a total number of 12 available cyclic shifts. The eNB can select L cyclic shifts in the 12 cycle shifts, and configure the UE to use one or more cyclic shifts in the selected L cyclic shifts. When L=4, the number of available SRS resources in the SRS bandwidth (4 RBs) is 16; and when $4<L\leq12$, the number of available SRS resources in the SRS bandwidth (4 RBs) is greater than 16, which increases relative to the number of available SRS resources in one SRS bandwidth (4 RBs) in the LTE system.

As RPF=4, a length of the SRS sequence is 1 RB, and the sequence used by the UE is a CG sequence with a length of 1 RB in a group of DMRS sequences corresponding to the UE.

Figure 6:
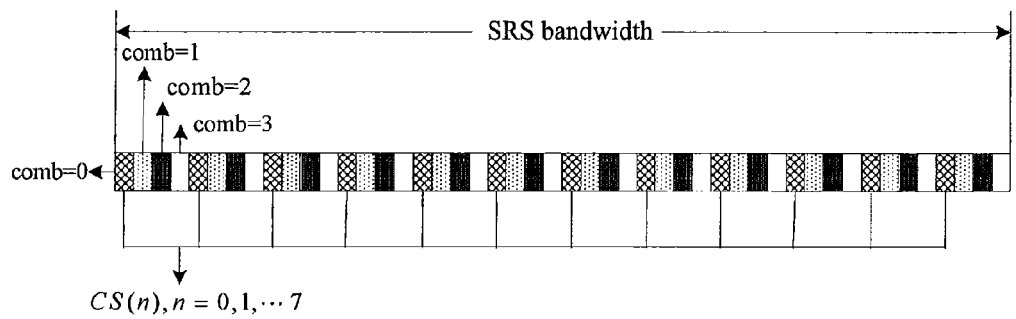
FIG. 6 is a schematic diagram of transmitting a SRS with RPF of 4 in application embodiment 3.
Figure 7:
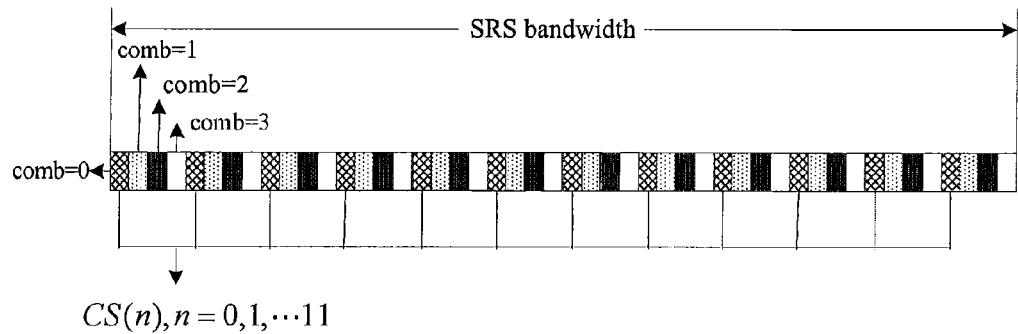
FIG. 7 is a schematic diagram of transmitting a SRS with RPF of 4 in application embodiment 3.

In step 302, after implementing the above configuration, the eNB transmits a notification message to the UE, and the notification message includes the following information: a value of the RPF, a location of a frequency comb used by the UE and a cyclic shift used by the UE; and the number of bits used for indicating the value of the RPF, the location of the frequency comb used by the UE and the cyclic shift used by the UE can be determined as required, for example, it can be but is not limited to using 1 bit to indicate the value of the RPF, using 1 bit or 2 bits to indicate the location of the frequency comb used by the UE, and selecting the number of bits which correspondingly indicate the location of the cyclic shift according to the value of L, for example, if $5<L\leq8$, 3 bits can be used for indicating the cyclic shift used by the UE; if $9<L\leq12$, 4 bits can be used for indicating the cyclic shift used by the UE. The condition of L=8 is shown in FIG. 6, and the condition of L=12 is shown in FIG. 7.

In step 303, after receiving the above notification message, the UE acquires the mode of the RPF, and the used frequency comb and cyclic shift. Then, the UE transmits the SRS on the configured frequency comb and cyclic shift.

In the embodiment, if L=8, the number of the available SRS resources in one SRS bandwidth (4 RBs) is 32, which increases 100% relative to the number of the available SRS resources in one SRS bandwidth (4 RBs) in the LTE system; and if L=12, the number of the available SRS resources in one SRS bandwidth (4 RBs) is 48, which increases 200% relative to the number of the available SRS resources in one SRS bandwidth (4 RBs) in the LTE system.

When the SRS bandwidth is 4 RBs and RPF=4, the time domain sequence of the SRS can further be equally divided into 4 portions, i.e., the total number of the cyclic shifts is 4. The eNB can configure the UE to use one or more cyclic shifts in the 4 cyclic shifts, and at this point, it is only needed to use 2 bits to indicate the cyclic shift used by the UE. The time domain sequence of the SRS pilot frequency can also be equally divided into 6 portions, i.e., the total number of cyclic shifts is 6. The eNB can configure the UE to use one or more cyclic shifts in the 6 cyclic shifts, and at this point, it is only needed to use 3 bits to indicate the cyclic shift used by the UE.

The above description is only the embodiments of the present invention and is not intended to limit the present invention. For those skilled in the art, the invention can have various modifications and variations. Any of modifications, equivalent substitutions and improvements etc., which is made within the spirit and principle of the present invention, should fall into the scope of the claims of the present invention.

INDUSTRIAL APPLICABILITY

The present invention provides a system and a method for allocating SRS resources, which can efficiently increase the number of SRS resources in the LTE-A system. When the number of frequency combs used by the UE is configured to be greater than 2 (for example 4), or the number of the cyclic shifts which can be used by the SRS is greater than 8, the SRS resources in the system can be increased efficiently.

What is claim is:
1. A method for allocating Sounding Reference Signal (SRS) resources, comprising:

an e-Node-B (eNB) allocating a SRS bandwidth with 4n Resource Blocks (RBs) to a terminal, and equally dividing a time domain sequence of a SRS into t portions in the SRS bandwidth;

the eNB configuring a time domain RePetition Factor (RPF) used by the terminal, and for each terminal, the eNB configuring the terminal to use one or more cyclic shifts in L cyclic shifts, then the eNB notifying the terminal of a value of the time domain RPF, a location of a used frequency comb and a used cyclic shift by signaling; wherein, n is a positive integer; the RPF satisfies a following condition:

$$\frac{48 \times n}{RPF}$$

can be exactly divided by 12; t is an integer by which $$\frac{48 \times n}{RPF}$$

can be exactly divided; and L≤t; and

L is the number of cyclic shifts.

2. The method according to claim 1, wherein, the RPF=2, and t is an integer by which 24n can be exactly divided; and the step of the eNB notifying the terminal of the value of the time domain RPF, the location of the used frequency comb and the used cyclic shift by signaling comprises: the eNB transmitting a notification message to the terminal, wherein the notification message includes the value of the time domain RPF, the location of the frequency comb used by the terminal and the cyclic shift used by the terminal, and the cyclic shift used by the terminal is indicated by i bit signaling, wherein $2^{i-1}<L\leq 2^i$, i is a natural number more than 0.

3. The method according to claim 2, wherein, when the SRS bandwidth allocated by the eNB to the terminal is 4 RBs, a value of the t is 8, 12 or 24, and a total number of the corresponding cyclic shifts is 8, 12 or 24 at this point; and when L=8, the eNB uses 3 bit signaling to indicate the cyclic shift used by the terminal; when 9<L≤16, the eNB uses 4 bit signaling to indicate the cyclic shift used by the terminal; and when 17<L≤24, the eNB uses 5 bit signaling to indicate the cyclic shift used by the terminal.

4. The method according to claim 1, wherein,

RPF=4, and the t is an integer by which 12n can be exactly divided; and the step of the eNB notifying the terminal of the value of the time domain RPF, the location of the used frequency comb and the used cyclic shift by signaling comprises: the eNB transmitting a notification message to the terminal, wherein the notification message includes the value of the time domain RPF, the location of the frequency comb used by the terminal and the cyclic shift used by the terminal, and the cyclic shift used by the terminal is indicated by i bit signaling, wherein $2^{i-1}<L\leq 2^i$, i is a natural number more than 0.

5. The method according to claim 4, wherein, when the SRS bandwidth allocated by the eNB to the terminal is 4 RBs, a value of the t is 4, 6 or 12; and when L=4, the eNB uses 2 bit signaling to indicate the cyclic shift used by the terminal; when 5<L≤8, the eNB uses 3 bit signaling to indicate the cyclic shift used by the terminal; and when 9<L≤12, the eNB uses 4 bit signaling to indicate the cyclic shift used by the terminal.

6. A system for allocating Sounding Reference Signal (SRS) resources, comprising an e-Node-B (eNB) and one or more terminals, wherein the eNB is configured to:

allocate a SRS bandwidth with 4n Resource Blocks (RBs) to the terminal, and equally divide a time domain sequence of a SRS into t portions in the SRS bandwidth;

configure a time domain RePetition Factor (RPF) used by the terminal in the SRS bandwidth, and configure to use one or more cyclic shifts in L cyclic shifts for each terminal, and notify the terminal of a value of the time domain RPF, a location of a used frequency comb and a used cyclic shift by signaling; wherein n is a positive integer; the RPF satisfies a following condition:

$$\frac{48 \times n}{RPF}$$

can be exactly divided by 12; t is an integer by which $$\frac{48 \times n}{RPF}$$

can be exactly divided; and L≤t,

L is the number of cyclic shifts.

7. The system according to claim 6, wherein,

RPF=2, and t is an integer by which 24n can be exactly divided; and the eNB is configured to: carry the value of the time domain RPF, the location of the frequency comb used by the terminal and the cyclic shift used by the terminal when transmitting a notification message to the terminal, wherein the cyclic shift used by the terminal is indicated by i bit signaling, wherein $2^{i-1}<L\leq 2^i$, i is a natural number more than 0.

8. The system according to claim 7, wherein the eNB is configured to:

let a value of the t to be 8, 12 or 24 when allocating the SRS bandwidth with 4 RBs to the terminal, wherein a total number of the corresponding cyclic shifts is 8, 12 or 24 at this point; and when L=8, use 3 bit signaling to indicate the cyclic shift used by the terminal; when 9<L≤16, use 4 bit signaling to indicate the cyclic shift used by the terminal; and when 17<L≤24, use 5 bit signaling to indicate the cyclic shift used by the terminal.

9. The system according to claim 6, wherein,

RPF=4, and t is an integer by which 12n can be exactly divided; and the eNB is configured to carry the value of the time domain RPF, the location of the frequency comb used by the terminal and the cyclic shift used by the terminal when transmitting a notification message to the terminal, wherein the cyclic shift used by the terminal is indicated by i bit signaling, wherein $2^{i-1}<L\leq 2^i$, i is a natural number more than 0.

10. The system according to claim 6, wherein the eNB is configured to:
- let a value of the t to be 4, 6 or 12 when allocating the SRS bandwidth with 4 RBs to the terminal; and
- when L=4, use 2 bit signaling to indicate the cyclic shift used by the terminal; when $5<L\leq 8$, use 3 bit signaling to indicate the cyclic shift used by the terminal; and when $9<L\leq 12$, use 4 bit signaling to indicate the cyclic shift used by the terminal.

* * * * *